(12) United States Patent
Imazato

(10) Patent No.: US 6,869,721 B2
(45) Date of Patent: Mar. 22, 2005

(54) PROCESS FOR PRODUCING GAS DIFFUSION ELECTRODE AND ELECTROCHEMICAL DEVICE

(75) Inventor: Minehisa Imazato, Tokyo (JP)

(73) Assignee: Sony Corporation, Tokyo (JP)

(*) Notice: Subject to any disclaimer, the term of this patent is extended or adjusted under 35 U.S.C. 154(b) by 205 days.

(21) Appl. No.: 09/967,345

(22) Filed: Sep. 28, 2001

(65) Prior Publication Data

US 2002/0049134 A1 Apr. 25, 2002

(30) Foreign Application Priority Data

Sep. 29, 2000 (JP) .................................. P2000-298812

(51) Int. Cl.$^7$ .............................................. H01M 8/10
(52) U.S. Cl. ......................................... 429/40; 429/42
(58) Field of Search .............................. 429/40, 42, 44, 429/45; 427/115, 566, 252

(56) References Cited

U.S. PATENT DOCUMENTS

| | | | |
|---|---|---|---|
| 5,470,680 A | | 11/1995 | Loutfy et al. |
| 5,561,000 A | * | 10/1996 | Dirven et al. .................. 429/42 |
| 6,159,533 A | * | 12/2000 | Dearnaley et al. ........... 427/115 |
| 6,403,245 B1 | * | 6/2002 | Hunt ............................ 429/33 |
| 6,572,997 B1 | * | 6/2003 | Iqbal et al. .................... 429/34 |
| 6,610,436 B1 | * | 8/2003 | Dearnaley et al. ............ 429/44 |
| 2002/0006539 A1 | | 1/2002 | Kubota et al. |
| 2002/0131182 A1 | * | 9/2002 | Baldwin et al. ............. 359/642 |

FOREIGN PATENT DOCUMENTS

| | | |
|---|---|---|
| EP | 0 106 197 | 4/1984 |
| JP | 1-169809 | 7/1989 |
| JP | 4-162362 | 6/1992 |
| JP | 6-292826 | 10/1994 |
| JP | 7-326363 | 12/1995 |
| JP | 9-265993 | 10/1997 |
| WO | WO 97/21256 | 6/1997 |
| WO | WO 99/13128 | * 3/1999 ............ H01M/2/10 |

OTHER PUBLICATIONS

U.S. Appl. No. 10/468,313, filed Aug. 15, 2003, Imazato, Gas Diffusing Electrode Body, Method of Manufacturing the Same, and Electrochemical Device.
U.S. Appl. No. 10/467,446, filed Aug. 6, 2003, Imazato, Gas Diffusive Electrode Body, and Method of Manufacturing the Electrode Body, and Electrochemical Device.
U.S. Appl. No. 10/110,277, filed Aug. 2, 2002, Imazato, Proton Conducting Electrode, Method for Preparation Thereof and Electro–Chemical Device.
U.S. Appl. No. 09/967,345, filed Sep. 28, 2001, Imazato, Process for Producing Gas Diffusion Electrode and Electrochemical Device.
U.S. Appl. No. 09/967,312, filed Sep. 28, 2001, Imazato, Fuel Cell and Method for Preparation Thereof.
U.S. Appl. No. 09/967,310, filed Sep. 28, 2001, Imazato, Electrochemical Device and Method for Preparation Thereof.
U.S. Appl. No. 09/967,309, filed Sep. 28, 2001, Imazato, Fuel Cell and Method for Preparation Thereof.
U.S. Appl. No. 09/967,215, filed Sep. 28, 2001, Imazato, Fuel Cell.
U.S. Appl. No. 08/807,587, filed Feb. 27, 1997, Imazato, Powder Sealing Device of Powder Beam Processing Machine.
Che et al., Carbon Nanotubule Membranes for Electrochemical Energy Storage and Production, NATURE, pp. 346–349, May 1998.

\* cited by examiner

Primary Examiner—Frankie L. Stinson
Assistant Examiner—Monique Wills
(74) Attorney, Agent, or Firm—Bell, Boyd & Lloyd LLC

(57) ABSTRACT

Processes and methods for producing a gas diffusion electrode are provided. The process of the present invention includes the steps of forming a sheet or other suitable structure of carbonaceous material and forming a catalyst layer on the carbonaceous material by vapor deposition.

16 Claims, 2 Drawing Sheets

PROCESS FOR PRODUCING GAS DIFFUSION ELECTRODE AND ELECTROCHEMICAL DEVICE

RELATED APPLICATION DATA

The present invention claims priority to Japanese Patent Document No. P2000-298812 filed on Sep. 29, 2000 which is hereby incorporated by reference to the extent permitted by law.

BACKGROUND OF THE INVENTION

The present invention relates to a process for producing a gas diffusion electrode and an electrochemical device including same.

Fossil fuel, such as gasoline and gas oil, has been a major energy source for automobiles and power generation since the Industrial Revolution. It has greatly contributed to the improvement of living standards and the development of industry. On the other hand, its enormous consumption is endangering the global environment and draining its resources, which raises concerns and questions regarding its supply over the long-term.

However, hydrogen has been regarded as a substitute for fossil fuel. In this regard, hydrogen can provide a clean, inexhaustible energy source for several reasons. It is a constituent of water and thus can be found in ample supply. It also contains a large amount of chemical energy per unit mass. Further, in use, it is a relatively clean source of energy and does not produce off-gases that can be detrimental to the environment as compared to typical energy sources. It does not emit noxious substances and greenhouse gas.

An apparatus to generate electric energy from hydrogen is continually being research and investigated. In general, the use of hydrogen as an energy source is expected to find use in large-scale power plants, on-site home power plants, as a power source for automobiles or the like.

For example, a fuel cell is generally known to generate electric energy from hydrogen or reaction thereof. The fuel cell generally includes a hydrogen electrode which is fed with hydrogen and an oxygen electrode which is fed with oxygen. On the hydrogen electrode, hydrogen dissociates into protons and electrons by catalysis. Electrons are collected by the current collector of the hydrogen electrode, and protons are transferred to the oxygen electrode. Electrons collected by the hydrogen electrode are transferred to the oxygen electrode through a load mechanism. On the oxygen electrode, oxygen combines by catalysis with protons and electrons transferred from the hydrogen electrode, thereby forming water. In this way there occurs an electromotive force across the hydrogen electrode and the oxygen electrode, which causes an electric current to flow through the load.

As mentioned above, for the fuel cell generating electric energy from hydrogen to create an electromotive force across the hydrogen electrode and the oxygen electrode, it requires that hydrogen should dissociate into protons and electrons on the hydrogen electrode and oxygen should react with protons and electrons to give rise to water on the oxygen electrode. Therefore, the hydrogen electrode may need a catalyst layer to facilitate the dissociation of hydrogen into protons and electrons and the oxygen electrode may require a catalyst layer to facilitate the reaction of oxygen with protons and electrons. Thus, a need exists to form a catalyst layer on the oxygen electrode and/or hydrogen electrode, for example, on the base. However, typical catalysts are materials made of chemically inert substances, and consequently it is difficult and expensive to form a catalyst layer on the oxygen electrode and/or hydrogen electrode.

SUMMARY OF THE INVENTION

It is an advantage of the present invention to provide a process for forming a catalyst layer on the oxygen electrode and/or hydrogen electrode with relative ease, thereby reducing the production time and costs associated with the manufacture of fuel cells.

In an embodiment of the present invention, there is provided a process for producing a gas diffusion electrode. The process includes forming a sheet, layer or other suitable structure of carbonaceous material thereby forming a catalyst layer on the carbonaceous material by a vapor deposition process.

In an embodiment of the present invention, there is provided a process for producing an electrochemical device. The process includes forming a gas diffusion electrode by forming a layer of catalyst material on a sheet or other suitable configuration of carbonaceous material by vapor deposition and applying an electrode material, such as an electrolyte, proton conducting material, other suitable material and combination thereof, to the catalyst layer on the gas diffusion electrode.

With this configuration, the present invention permits the catalyst layer to be formed on a sheet of carbonaceous material by vapor deposition, which facilitates the production of the gas diffusion electrode. This in turn curtails the production cost of electrochemical devices, such as a fuel cell, an air cell, and the like.

Additional features and advantages of the present invention are described in, and will be apparent from, the following Detailed Description of the Invention and the Figures.

DESCRIPTION OF THE INVENTION

Figure 1:
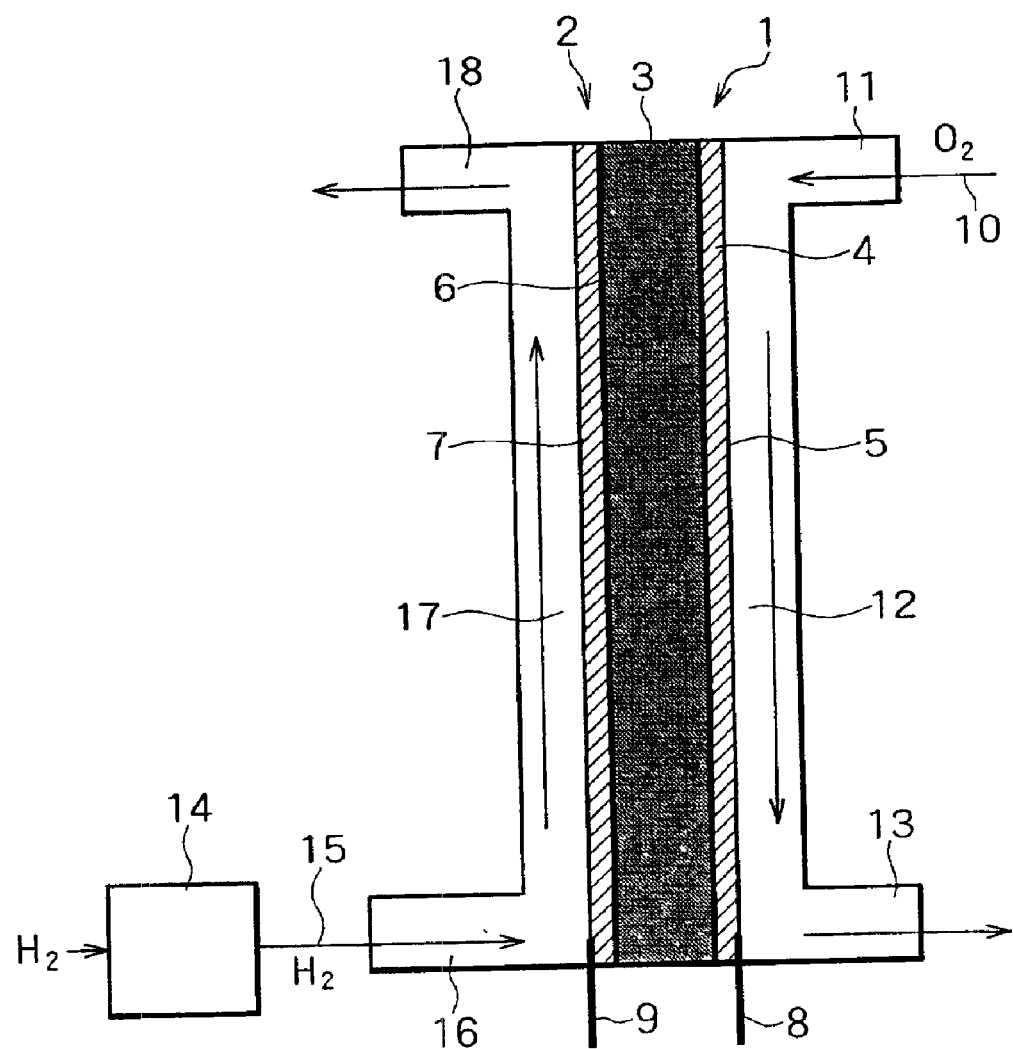
FIG. 1 is a schematic diagram showing a fuel cell that includes a gas diffusion electrode according to an embodiment of the present invention.

The present invention will be described in more detail with reference to the accompanying drawings.

In an embodiment, the process of the present invention includes the preparation of a filter having a prescribed or defined area and a fluid suspension containing a carbonaceous material, such as a carbon nanotube, other suitable material, or combination thereof, to support a catalyst. The filter can include a glass fiber material or the like capable of filtering the fluid suspension and collecting the carbon nanotube contained therein. In an embodiment, the fluid suspension can be prepared by dispersing, mixing or the like, a carbon nanotube in a mixture of water, alcohol (such as, methanol and ethanol), and toluene which can be incorporated with a trace amount of sodium hydroxide. In this regard, sodium hydroxide can prevent the carbon nanotube material component from aggregating.

A carbon nanotube is a carbonaceous material in a tubular or other like form having a diameter smaller than several nanometers, typically about 1.2 to about 1.7 nanometers. In general, it is available and known in two kinds: single-wall carbon nanotube (SWCNT) constructed of a single layer and multi-wall carbon nanotube (MWCNT) constructed of two or more coaxial layers. It is typically several micrometers long, although not specifically restricted. Carbon nanotubes that have a particularly large diameter are referred to a carbon nanofiber. Carbon nanofiber typically has a diameter larger than several nanometers, even as large as one micrometer. It should be appreciated that the term "carbon nanotube" as referred to below is intended to mean carbon nanotubes and/or carbon nanofibers.

Carbon nanotubes can be produced in any suitable manner, such as from a graphite rod by arc discharge.

In an embodiment, the fluid suspension of carbon nanotube is filtered through the above-mentioned filter, such that carbon nanotube deposits on the surface of the filter. Since a carbon nanotube is composed of fine fibrous material, a large number of pieces of carbon nanotube can entangle, entwine, combine or otherwise form with one another to form an integral sheet, layer or other like structure of material composed of carbon nanotubes.

The sheet-like aggregate of carbon nanotubes formed on the filter surface is peeled off or removed from it and then transferred into a sputtering chamber or other like process chamber.

In the sputtering chamber, the sheet-like aggregate of carbon nanotube undergoes sputtering so that a catalyst layer is formed thereon. In an embodiment, the catalyst can include a material, such as platinum, platinum alloy, palladium, magnesium, titanium, manganese, lanthanum, zirconium, nickel-lanthanum alloy, titanium-iron alloy, iridium, rhodium, gold and combinations thereof. Of these, platinum and platinum alloy are preferable. The process step performed in this way permits the catalyst to be supported on at least a portion of the surface of the aggregate of carbon nanotube that defines a sheet or layered type structure.

The above-mentioned process step provides a carbon nanotube material having a catalyst layer applied thereto. In this regard, the carbon nanotube material is electrically conductive because it is composed of carbon nanotubes. Moreover, it can be used as a gas diffusion electrode for fuel cells and air cells because it carries a catalyst layer formed of its surface.

As discussed above, Applicants have discovered a process for producing a gas diffusion electrode in a very simple way and hence which can facilitate the production of a gas diffusion electrode at a reduced production cost.

The above-mentioned embodiment employs a carbon nanotube as a carbonaceous material to support a catalyst and also employs a fluid suspension containing same to form a material composed of carbon nanotubes in the form of a sheet, layer or other suitable stucture. It should be appreciated that the carbonaceous material is not restricted to carbon nanotubes, but may include a variety of different and suitable materials, such as needle-like graphite, graphite composed of fibers, fibrous graphite or a mixture thereof including carbon nanotubes or the like. The selection of the carbonaceous material essentially depends on the mechanical strength and gas permeability requirements of the gas diffusion electrode.

The advantage of carbon nanotubes as a carbonaceous material to support a catalyst is its ability to readily form a sheet or layered material due to the entanglement or otherwise forming of its fine fibrous structural components. However, the resulting sheet of carbon nanotubes may not have sufficient gas permeability required of gas diffusion electrodes if carbon nanotube fibers are excessively accumulated and/or aggregated. Therefore, the sheet of carbon nanotube can be limited in thickness and hence in mechanical strength. On the other hand, the advantage of needle-like graphite over carbon nanotube is its finely sized structural components which can result in a sheet or layered structure having a thickness which also has sufficient gas permeability required of gas diffusion electrodes. However, a needle-like graphite material may not readily form a sheet material as compared to carbon nanotubes because of its weak tendency toward entanglement or otherwise structural fit of its finely sized and fibrous material components. In an embodiment, a mixture of carbon nanotube and needle-like graphite is desirable as the carbonaceous material to provide a sheet material that has a desirable gas permeability and mechanical strength required of gas diffusion electrodes such that the carbonaceous material can effectively support a catalyst layer to form a gas diffusion electrode.

An explanation is made below of a fuel cell of the present invention which includes a gas diffusion electrode prepared by the steps mentioned above. In an embodiment, the fuel cell is schematically shown in FIG. 1.

The fuel cell according to the present invention has an oxygen electrode 1, a hydrogen electrode 2 (which is a fuel electrode), and a proton conductor 3 (which includes, for example, an electrolyte membrane, an electrode membrane, other suitable membrane material, like electrode material or combinations thereof disposed or held between the oxygen electrode 1 and the hydrogen electrode 2). The oxygen electrode 1 includes an electrode base 4 (which is a sheet-like or layered aggregate composed of carbon nanotubes) and a catalyst layer 5 formed thereon. Likewise, the hydrogen electrode 2 includes an electrode base 6 (which is a sheet-like or layered aggregate of carbon nanotube) and a catalyst layer 7 formed thereon.

As shown in FIG. 1, the electrode base 4 of the oxygen electrode 1 has a positive electrode lead 8, and the electrode base 6 of the hydrogen electrode 2 has a negative electrode lead 9. The positive electrode lead 8 and the negative electrode lead 9 are connected to a load (not shown). Adjacent to the oxygen electrode 1 are an inlet 11, a channel 12, and an outlet 13 through which air 10 is admitted, passed, and discharged. Adjacent to the hydrogen electrode 2 are an inlet 16, a channel 17 and an outlet 18 through which hydrogen 15 is supplied (from a hydrogen source 14), passed and discharged.

Having been supplied to the channel 17 through the inlet 16, the hydrogen 15 reaches the catalyst layer 7 formed on the electrode base 6 which is a sheet-like aggregate of carbon nanotube, to dissociate into protons and electrons by a catalytic mechanism. The electrons move to the negative electrode lead 9 through the electrode base 6 and finally to a load (not shown). The protons move to the oxygen electrode 1 through the proton conductor 3. Having been supplied to the channel 12 through the inlet 11, the oxygen 10 reaches the catalyst layer 5 formed on the electrode base 4 which is a sheet-like aggregate of carbon nanotube, to combine or reach under a catalytic mechanism with the protons (supplied from the proton conductor 3) and the electrons (supplied from the load through the positive electrode lead 8), thereby forming water. In this way, there is created a desired electromotive force.

The proton conductor 3 is a membrane or other like structured material which prevents the passage of hydrogen 15 but permits the passage of protons. It may be formed from any material without specific restrictions; a preferred material is a carbonaceous material incorporated with functional groups capable of releasing and/or dissociating protons by electrolytic dissociation. (Such functional groups are referred to as "proton-dissociative groups" hereinafter.)

The carbonaceous material for the proton conductor 3 is not specifically restricted so long as it is composed mainly of carbon. It requires that its ion conductivity should exceed its electron conductivity after introduction of proton-dissociative groups. The carbonaceous material as the base can include a carbon cluster (which is an aggregate of carbon atoms), carbon nanotube, other suitable materials or mixtures thereof.

A carbon cluster is available in several types. Those having the fullerene structure (with or without an open end) and diamond structure are desirable. Any suitable carbon cluster is acceptable so long as its ion conductivity exceeds its electron conductivity after introduction of proton-dissociative groups.

In an embodiment, fullerene is used as the carbonaceous material from which the proton conductor 3 is produced. This type of carbonaceous material should preferably be used after introduction of proton-dissociative groups such as —OH groups, —OSO$_3$H groups, —COOH groups, —SO$_3$H groups, and —OPO(OH)$_2$ groups.

The above-mentioned carbonaceous material for the proton conductor 3 may be replaced by a perfluorosulfonic acid resin, other suitable material or combination thereof.

The hydrogen source 14 may be a hydrogen cylinder, a hydrogen occuluding alloy, a carbonaceous material or the like. In an embodiment, the carbonaceous material includes fullerene, carbon nanofiber, carbon nanotube, carbon soot, nanocapsule, bucky onion, carbon fiber, the like or mixtures thereof.

In an embodiment, the fuel cell constructed as mentioned above is produced by the process explained below. The first step is to prepare gas diffusion electrodes (as the oxygen electrode 1 and the hydrogen electrode 2) in the above-mentioned method. The catalyst layers 5 and 7 on the oxygen electrode 1 and the hydrogen electrode 2 are coated with a proton conducting material. The proton conducting material should preferably be the same, or substantially similar type of material as used for the proton conductor 3, although it is not specifically restricted to this configuration. In the case where the proton conductor 3 is made of fullerenol (which is fullerene in which —OH groups have been introduced), it is desirable to use fullerenol as the proton conducting material to be added by a fluid suspension containing fullerenol as previously discussed. Then, the proton conductor 3 is held between the catalyst layers 5 and 7 on the oxygen electrode 1 and the hydrogen electrode 2. Adjacent to the oxygen electrode 1 are arranged an inlet 11 for air 10, a channel 12, and an outlet 13. Adjacent to the hydrogen electrode 2 are arranged an inlet 16 for hydrogen 15, a channel 17, and an outlet 18. In this way the desired fuel cell is completed.

The advantage of the fuel cell in this embodiment is a reduced production cost resulting from the relatively simple process for producing the gas diffusion electrodes as the oxygen electrode 1 and/or the hydrogen electrode 2.

In an embodiment, the gas diffusion electrode prepared as mentioned above can be applied to an air cell which is explained below.

Figure 2:
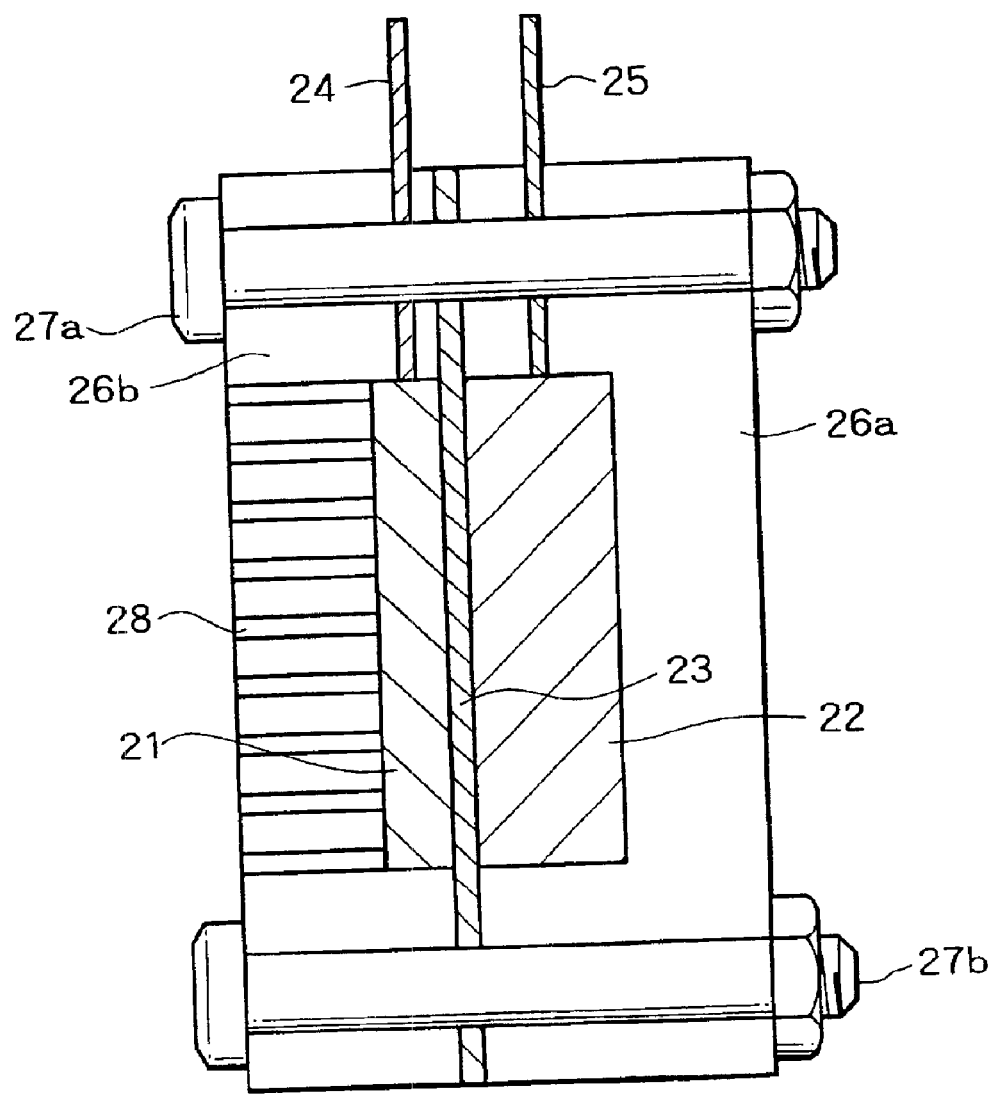
FIG. 2 is a schematic diagram showing an air cell that includes a gas diffusion electrode according to an embodiment of the present invention.

FIG. 2 is a schematic diagram showing the air cell equipped with the gas diffusion electrode according to an embodiment of the present invention.

The air cell (e.g., air-zinc cell) shown in FIG. 2 has an air electrode 21, a negative electrode 22, and an electrolyte 23 held between the air electrode 21 and the negative electrode 22. The air electrode 21 is composed of an electrode base (e.g., a carbon sheet) and a catalyst layer formed thereon. The negative electrode 22 can include, for example, a sheet or layer of material, such as zinc or the like, that has a thickness of about 100 μm. The base of the air electrode 21 has a positive electrode lead 24, and the negative electrode 22 has a negative electrode lead 25. These leads 24 and 25 are connected to a load (not shown). The air electrode 21, the negative electrode 22, and the electrolyte 23 held between them are held between Teflon sheets 26a and 26b, both about 3 mm in thickness, which are fixed by bolts or the like 27a and 27b. The Teflon sheet 26b can have a number of air holes 28 (approximately 1.5 mm in diameter) through which air is supplied to the air electrode 21.

The air cell constructed as mentioned above can be produced in the following manner. The first step is to prepare the air electrode 21 by forming a catalyst layer on a carbon sheet in the above-mentioned method. A number of through holes (not shown), about 0.1 mm in diameter, are made in the air electrode 21, at a density of about 400 holes per square centimeter. The catalyst layer on the air electrode 21 is coated with an electrolyte, such as a gelled aqueous solution of zinc chloride to form a layer, about 50 μm in thickness. The negative electrode 22 is then attached thereto. Finally, the assembly is firmly held between the Teflon sheets 26a and 26b and fixed by the bolts 27a and 27b. In this way, the air cell is effectively produced.

The air cell obtained as mentioned above permits reactions (1) and (2) to take place respectively at the air electrode 21 and the negative electrode 22.

$$O_2 + 2H_2O + 4e \rightarrow 4OH \quad (1)$$

$$Zn + 2OH \rightarrow Zn(OH)_2 + 2e \quad (2)$$

As a whole, the reaction (3) takes place to generate a prescribed electromotive force.

$$\tfrac{1}{2}O_2 + Zn + H_2O \rightarrow Zn(OH)_2 \quad (3)$$

As shown above, this embodiment permits the air electrode 21 (as a gas diffusion electrode) to be prepared in a very simple manner. This can lead to a cost reduction in the preparation of air cells.

The above-mentioned embodiment is not intended to restrict the scope of the invention. Various changes and modifications may be made to the invention without departing from the spirit and scope thereof.

For example, the sputtering used in the embodiment to form the catalyst layer on the sheet-like aggregate of carbon nanotube may be replaced by chemical vapor deposition, such as vacuum deposition, pulse laser deposition or the like.

The fuel cell in the embodiment is produced in such a way that the proton conductor 3 is held between the catalyst layers on the two gas diffusion electrodes. In an alternative embodiment, an additional catalyst layer can be disposed between the proton conductor 3 and the catalyst layer on the gas diffusion electrode. Such an additional catalyst layer can increase the mechanical strength of the electrode as a whole and increase the amount of catalyst, thereby improving the efficiency of energy generation.

The above-mentioned embodiment can optimally include the step of coating the catalyst layers 5 and 7 with a proton conducting material or other suitable electrode material.

The above-mentioned embodiment employs as the fluid suspension a mixture of water, alcohol (such as methanol and ethanol), and toluene, incorporated with a trace amount of sodium hydroxide. However, the fluid suspension may contain any other suitable components.

The above-mentioned embodiment employs hydrogen gas as the fuel gap for the fuel cell. The hydrogen gas may be replaced by any other suitable fuel gases, such as gasified methanol. In this regard, the reaction (4) can occur at the negative electrode fed with methanol gas and the reaction (5) can occur at the positive electrode (oxygen electrode 1) fed with air.

$$CH_3OH + H_2O \rightarrow CO_2 + 6H^+ + 6e \quad (4)$$

$$6H^+ + \tfrac{3}{2}O_2 + 6e \rightarrow 3H_2O \quad (5)$$

As a whole, the reaction (6) takes place to generate a prescribed electromotive force.

$$CH_3OH + \tfrac{3}{2}O_2 \rightarrow CO_2 + 2H_2O \quad (6)$$

In the case where methanol gas is used as a fuel gas, the fuel cell produces carbon dioxide in addition to water.

Although the present invention has been described with reference to specific embodiments, those of skill in the art will recognize that changes may be made thereto without departing from the spirit and scope of the invention as set forth in the hereafter appended claims.

What is claimed is:

1. A process for producing an electrode capable of gas diffusion comprising the steps of:
   forming a sheet of carbonaceous material, wherein the carbonaceous material comprises a carbon nanotube; and
   forming a layer of catalyst material on the sheet by a vapor deposition process, and forming the gas diffusion electrode.

2. The process as claimed in claim 1, wherein the carbonaceous material further comprises a graphite material composed of fibers.

3. The process as claimed in claim 1, wherein the step of forming the sheet is conducted by filtering a fluid suspension containing the carbonaceous material.

4. The process as claimed in claim 1, wherein the step of forming the layer of catalyst material is performed by a sputtering process.

5. The process as claimed in claim 1, wherein the step of forming the layer of catalyst material is performed by a vacuum deposition process.

6. The process as claimed in claim 1, wherein the step of forming the layer of catalyst is conducted by a pulse laser deposition process.

7. The process as claimed in claim 1, wherein the layer of catalyst comprises a material selected from the group consisting of platinum, platinum alloy, palladium, magnesium, titanium, manganese, lanthanum, vanadium, zirconium, nickel-lanthanum alloy, titanium-iron alloy, iridium, rhodium, gold, and mixtures thereof.

8. A process for producing an electrochemical device, including a gas diffusion electrode comprising the steps of:
   providing a carbonaceous material;
   applying a layer of catalyst material to the carbonaceous material by a vapor deposition process, wherein the carbonaceous material comprises a carbon nanotube;
   applying an electrode material to the layer of catalyst; and
   forming the gas diffusion electrode.

9. The process as claimed in claim 8, wherein the electrochemical device comprises a fuel cell.

10. The process as claimed in claim 8, wherein the electrochemical device comprises an air cell.

11. The process as claimed in claim 8, wherein the carbonaceous material further comprises a graphite composed of fibers.

12. The process as claimed in claim 8, wherein the carbonaceous material is formed into a sheet layer by filtering a fluid suspension containing the carbonaceous material.

13. The process as claimed in claim 8, wherein the layer of catalyst is formed by a sputtering process.

14. The process as claimed in claim 8, wherein the layer of catalyst is formed by a vacuum deposition process.

15. The process as claimed in claim 8, wherein the layer of catalyst is formed by a pulse laser deposition process.

16. The process as claimed in claim 8, wherein the layer of catalyst comprises a material selected from the group consisting of platinum, platinum alloy, palladium, magnesium, titanium, manganese, lanthanum, vanadium, zirconium, nickel-lanthanum alloy, titanium-iron alloy, iridium, rhodium, gold and mixtures thereof.

* * * * *